(12) United States Patent
Hoffmann et al.

(10) Patent No.: US 9,862,237 B2
(45) Date of Patent: Jan. 9, 2018

(54) TREAD PROFILE OF A PNEUMATIC VEHICLE TIRE WITH AN INDICATOR FOR REGROOVING THE PROFILE

(71) Applicant: Continental Reifen Deutschland GmbH, Hannover (DE)

(72) Inventors: Jens Hoffmann, Meersbusch (DE); Alexander Wuest, Seelze (DE); Amelia Olga Goncalves Ankiewicz, Hannover (DE); Tim Tkocz, Braunschweig (DE); Anastassia Pokutta-Paskaleva, Hannover (DE)

(73) Assignee: Continental Reifen Deutschland GmbH, Hannover (DE)

(*) Notice: Subject to any disclaimer, the term of this patent is extended or adjusted under 35 U.S.C. 154(b) by 562 days.

(21) Appl. No.: 14/306,034

(22) Filed: Jun. 16, 2014

(65) Prior Publication Data

US 2014/0290813 A1    Oct. 2, 2014

Related U.S. Application Data

(63) Continuation of application No. PCT/EP2012/074472, filed on Dec. 5, 2012.

(30) Foreign Application Priority Data

Dec. 15, 2011   (DE) .................. 10 2011 056 451

(51) Int. Cl.
  *B60C 11/24*    (2006.01)
  *B60C 11/03*    (2006.01)
  *B60C 11/13*    (2006.01)

(52) U.S. Cl.
  CPC ............ *B60C 11/24* (2013.01); *B60C 11/032* (2013.01); *B60C 11/1353* (2013.01); *Y10T 152/10027* (2015.01)

(58) Field of Classification Search
  CPC ... B60C 11/24; B60C 11/125; B60C 11/1353; B60C 11/032; B60C 11/0323
  See application file for complete search history.

(56) References Cited

U.S. PATENT DOCUMENTS

| 6,003,576 A | 12/1999 | Auxerre et al. |
| 8,584,721 B2* | 11/2013 | Fujii ................ B60C 11/24 152/154.2 |
| 2012/0267020 A1* | 10/2012 | Buchinger-Barnstorf B60C 11/045 152/209.18 |

FOREIGN PATENT DOCUMENTS

| DE | 102010000637 | * | 9/2011 |
| GB | 1 412 351 A1 | | 11/1975 |

(Continued)

OTHER PUBLICATIONS

English machine translation of JP2001-191736, no date.*

(Continued)

*Primary Examiner* — Robert Dye
(74) *Attorney, Agent, or Firm* — Walter Ottesen, P.A.

(57) ABSTRACT

A regroovable tread profile of a pneumatic vehicle tire includes a regrooving indicator formed with an additional indent in the base of the depression in the form of a blind hole lying transversely in relation to the main direction of extent (U) of the groove and having a length of extent ($A_2$) and an indent depth (B), where (B) is formed such that $B<A_2$ and $B<A_1$ and $B<L$ and with a depth of extent ($T_2$) where $T_2>T_1$, which is measured starting from the groove base inward in the radial direction (R) to the base bounding the indent radially inwardly. The depth of extent ($T_1$) forms the measure for the minimum regrooving depth and the depth of extent ($T_2$) forms the measure for the maximum regrooving depth.

14 Claims, 2 Drawing Sheets

(56) References Cited

FOREIGN PATENT DOCUMENTS

JP      2001-191736    *   7/2001
JP      2005-067407    *   3/2005

OTHER PUBLICATIONS

English machine translation of JP2005-067407, no date.*
International Search Report dated Feb. 7, 2013 of international application PCT/EP2012/074472 on which this application is based.

* cited by examiner

TREAD PROFILE OF A PNEUMATIC VEHICLE TIRE WITH AN INDICATOR FOR REGROOVING THE PROFILE

CROSS REFERENCE TO RELATED APPLICATIONS

This application is a continuation application of international patent application PCT/EP2012/074472, filed Dec. 5, 2012, designating the United States and claiming priority from German application 10 2011 056 451.9, filed Dec. 15, 2011, and the entire content of both applications is incorporated herein by reference.

FIELD OF THE INVENTION

The invention relates to a tread profile of a pneumatic vehicle tire—particularly for commercial vehicles—having a regroovable tread profile having radially raised profile elements and having grooves, each of which separates two adjacent profile elements from one another and is delimited in the radially inward direction by a groove base, wherein at least one regrooving indicator having a depression in the form of a blind hole formed in the groove base is formed in the groove base, wherein the depression in the form of a blind hole is formed with its intersection contour in the groove base with a length L of extent measured in the principal direction of extent of the groove and with a width $A_1$ of extent measured transversely to the principal direction of extent of the groove, and wherein the depression in the form of a blind hole is delimited in the radially inward direction R by a depression base and is formed with a depth $T_1$ of extent, measured in the radially inward direction R as far as the depression base, starting from the groove base, to indicate a regrooving depth.

BACKGROUND OF THE INVENTION

The practice of forming pneumatic vehicle tires with a tread profile in which radially raised profile elements are spaced apart by grooves is known. In this case, the tread profiles are formed with a profile depth optimized for the respective use. In this case, the grooves are formed with the maximum profile depth to the maximum extent over most of the area of extent thereof.

The practice of forming the tread profile in a manner optimized for the use, including a profile depth set in an optimized way for this purpose, is known in the case of pneumatic tires for commercial vehicles. Many commercial vehicle tires are formed from circumferential grooves extending over the circumference of the tire and from circumferential ribs separated from said grooves or profile block rows extending over the circumference, wherein the relatively wide circumferential grooves are formed with a maximum profile depth across the circumference over most of the area of extent thereof.

Another known practice in the case of pneumatic commercial vehicle tires of this kind is to form the tread with an additional thickness of material to prolong the life of the tire, with the result that there is a relatively large amount of rubber material between the belt of the commercial vehicle tire and the tire surface, including below the groove bottom of the circumferential grooves. The profile depth determined for the optimum use of a new tire is maintained by constructing it with the conventionally optimized profile and the maximum profile depth suitable therefor. As soon as the tread profile has worn down to such an extent that the required minimum profile depth remains, the profile of pneumatic commercial vehicle tires of this kind can be regrooved once more. The suitability for regrooving is indicated on the commercial vehicle tire.

For regrooving, the pneumatic commercial vehicle tires are removed from the vehicle and regrooved manually using special regrooving tools. For this purpose, the person performing the regrooving must in each case use a regrooving tool suitable for the respective regroove, this being selected in accordance with the respective groove shape. The special regrooving tool is inserted into the groove and drawn across the circumference of the pneumatic commercial vehicle tire, thereby removing rubber material from the lower groove base and from the lower groove flank region and leaving deepened grooves. For this purpose, the person performing the regrooving must set the penetration depth with a high accuracy and keep it as constant as possible. If the penetration depth is too small, the use of the pneumatic commercial vehicle tire is prolonged only slightly. To achieve accurate shaping of the desired recut circumferential groove, the special dies for regrooving furthermore require a minimum regrooving depth. If the regrooving depth selected is too small, this has a negative effect on the recut cross-sectional contour of the circumferential groove. Excessively deep regrooving can limit the durability and utility of the regrooved tire in an unwanted way. High accuracy in the regrooving depth to be maintained is therefore especially important. Achieving an optimum penetration depth and keeping it constant during cutting therefore involves a lot of effort for the person performing the regrooving.

One proposal already made in the context of a tread profile of this kind on a pneumatic commercial vehicle tire is to form, in the groove base of the circumferential groove, a circular-cylindrical depression similar to a bore which is delimited in the radial direction by a depression base, wherein the depression base is formed at the depth, measured from the groove base, intended to correspond to the regrooving depth. In this regrooving indicator, the depression base is therefore configured as a measure of the regrooving depth to be set and maintained. For regrooving, the person performing the regrooving takes the appropriate regrooving tool for the shape of the circumferential groove and for the regrooving depth to be cut and recuts the circumferential groove. The only reference point for monitoring and maintaining the regroove is the depression base. The person performing the regrooving does therefore admittedly have clear information on whether they have not yet reached the desired regrooving depth or whether they have already reached it. However, they do not have any information on whether they have just reached the regrooving depth indicated in the tire, have already exceeded it slightly or have already significantly exceeded it, necessitating rejection. The accuracy of regrooving is thus still limited and very dependent on the individual manner of approach of the person performing the regrooving. In order to ensure high accuracy in the regrooving quality, a lot of additional effort and very carefully monitored regrooving work is thus required.

It has sometimes also been proposed to impart information on the regrooving work with the aid of fine indents in the groove base. However, simply using fine indents in the groove base as regrooving indicators does not allow simple optical premeasurement of the regrooving depth that is actually possible for the respective circumferential groove, this premeasurement understandably being desired and generally being carried out with conventional depth measuring equipment by the person performing the manual regrooving.

Here, the person performing the regrooving would have to rely completely on general information available to them without themselves checking beforehand the regrooving depth that would actually be correct for the respective regrooving operation on the tire at hand. With their simple optical measuring instruments, they cannot check quickly and easily whether the regrooving depth that actually remains corresponds to assumptions, possibly owing to damage or incorrect handling. For this purpose, the person performing the regrooving would have to acquire and employ special measuring devices and measuring methods which go beyond a purely visual check.

SUMMARY OF THE INVENTION

It is an object of the invention to provide a tread profile of a pneumatic vehicle tire with simple aids for accurate, reliable regrooving.

According to the invention, the object is achieved, by a tread profile of a pneumatic vehicle tire—particularly for commercial vehicles—having a regroovable tread profile having radially raised profile elements and having grooves, each of which separates two adjacent profile elements from one another and is delimited in the radially inward direction by a groove base, wherein at least one regrooving indicator having a depression in the form of a blind hole formed in the groove base is formed in the groove base, wherein the depression in the form of a blind hole is formed with its intersection contour in the groove base with a length L of extent measured in the principal direction of extent of the groove and with a width $A_1$ of extent measured transversely to the principal direction of extent of the groove, and wherein the depression in the form of a blind hole is delimited in the radially inward direction R by a depression base and is formed with a depth $T_1$ of extent, measured in the radially inward direction R as far as the depression base, starting from the groove base, to indicate a regrooving depth, in which the regrooving indicator is formed with an additional indent, which is aligned transversely to the principal direction of extent of the groove, at least in the depression base of the depression in the form of a blind hole, and has a length $A_2$ of extent and an indent width B, where B is formed such that $B<A_2$ and $B<A_1$ and $B<L$, and a depth $T_2$ of extent, where $T_2>T_1$, which is measured in the radially inward direction R, starting from the groove base, as far as the indent base delimiting the indent radially on the inside, wherein the depth $T_1$ of extent forms the measure of the minimum regrooving depth and the depth $T_2$ of extent forms the measure of the maximum regrooving depth.

This configuration makes it possible to use such pneumatic vehicle tires with an optimized profile while continuing to exploit the advantages of regrooving, with the aid of the regrooving indicator having the depression in the form of a blind hole having the depth $T_1$ of extent and having the additional indent, which is aligned transversely to the principal direction of extent of the groove, at least in the depression base of the depression in the form of a blind hole, and the indent width B of which is both less than $A_2$ and less than $A_1$ and less than L, and the depth $T_2$, the extent of which is less than $T_1$. The depression base of the depression in the form of a blind hole makes it possible to indicate the minimum regrooving depth $T_1$, and the indent base additionally makes it possible to provide an indication of the maximum regrooving depth $T_2$. As long as the person performing the regrooving can see the depression base during the regrooving process, they have the information that the minimum regrooving depth has not yet been reached and that cutting should be continued. When the person performing the regrooving can no longer see the depression base but can still see the indent base, the person performing the regrooving knows that they are within the optimum recommended regrooving range. As soon as the indent base is also no longer visible to the person performing the regrooving, they know immediately that they have cut too deep and that the commercial vehicle tire is no longer suitable for use. By virtue of its relatively large dimensions relative to the fine indent width, the depression in the form of a blind hole makes possible a simple and also visual check of the depth with conventional known measuring means and measuring methods, including optical means and methods, enabling the correct tool to be chosen. The person performing the regrooving can thus premeasure at least the minimum indent depth in a conventional manner before regrooving, select the appropriate regrooving tool and then recut the respective groove with high accuracy in a reliable and simple manner. Moreover, the regrooving indicator saves space. The person performing the regrooving receives both items of information, both that on the maximum regrooving depth and also that on the minimum regrooving depth, at a single position in a groove. Through the space-saving joint formation of both indications in one indicator, it is furthermore possible to avoid negative effects on other design parameters of the tire due to complex arrangements for their accommodation.

It is particularly advantageous if a tread profile is formed in accordance with the features of a further embodiment, wherein the first length L of extent of the depression in the form of a blind hole is formed so that 2 mm≤L≤5 mm and the width $A_1$ of extent is formed so that 2 mm≤$A_1$≤5 mm. This configuration additionally favors simple optical and mechanical measurement of the regrooving depth.

It is particularly advantageous if a tread profile is formed in accordance with the features of a further embodiment, wherein the depth $T_1$ is formed so that 0.5 mm≤$T_1$≤5 mm and the depth $T_2$ is formed so that 1.5 mm≤$T_2$≤6 mm. This configuration additionally favors simple optical and mechanical measurement of the regrooving depth, while giving the indicator a high mechanical load-bearing capacity.

It is particularly advantageous if a tread profile is formed in accordance with the features of an embodiment, wherein the depth $T_1$ and the depth $T_2$ are formed so that $T_2=(T_1+1$ mm). Both a minimum and a maximum cutting depth are thereby indicated, wherein these two indicated depths are close together and are nevertheless indicated in a clearly distinguishable way. The different indication positions can be produced reliably and, by virtue of the small spacing, allow a very accurately defined regrooving depth.

It is particularly advantageous if a tread profile is formed in accordance with the features of a further embodiment, wherein the width B of the indent is formed so that 0.5 mm≤B≤1 mm. As a result of this configuration, the conceivable slight influence of the indicator on the circumferential stiffness of the tire is additionally minimized in the region of the indicator while ensuring indications for the minimum and maximum regrooving depth.

It is particularly advantageous if a tread profile is formed in accordance with the features of another embodiment, wherein the width $A_1$ of extent of the depression and the length $A_2$ of extent of the indent are formed so that $A_2>A_1$. It is thereby possible to further increase the visibility of the indicator while providing a constant mechanical measuring capacity.

It is particularly advantageous if a tread profile is formed in accordance with the features of a further embodiment, wherein the length $A_2$ of extent of the indent is formed so that $A_2 > B_{RG}$, where $B_{RG}$ is the width of the groove, measured transversely to the principal direction of extent in the groove, at the groove base, and wherein, in particular, the length $A_2$ of extent of the indent is formed so that $A_2 < B_{RO}$, where $B_{RO}$ is the width of the groove, measured transversely to the principal direction of extent in the groove, in the radially outer circumferential surface of the tire. As a result of this configuration, the regrooving depth is additionally indicated as well.

It is particularly advantageous if a tread profile is formed in accordance with the features of a further embodiment, wherein the depression in the form of a blind hole is formed with a circular, elliptical or oval intersection contour at the groove base. It is thereby possible to further optimize the mechanical load-bearing capacity of the indicator.

It is particularly advantageous if a tread profile is formed in accordance with the features of another embodiment, wherein the depression in the form of a blind hole is of cylindrical design with a cylinder axis formed substantially in the radial direction R, wherein the depression base forms one end face of the cylinder and the surface enveloped by the cut contour with the groove base forms the other end face of the cylinder. As a result of this configuration, the mechanical measuring capacity can be further improved.

It is particularly advantageous if a tread profile is formed in accordance with the features of a further embodiment, wherein the depression in the form of a blind hole is of frustoconical design with a cone axis formed substantially in the radial direction R. The depression base forms one, smaller end face of the frustocone and the surface enveloped by the intersection contour with the groove base forms the larger end face of the frustocone. As a result of this configuration, good measuring capacity in combination with a particularly high maximum mechanical load-bearing capacity of the indicator can be implemented.

It is particularly advantageous if a tread profile is formed in accordance with the features of a further embodiment, wherein the regrooving indicator is formed in a raised portion of the groove base, the raised portion forming an abrasion indicator (TWI). This design allows regrooving indication and abrasion indication in an integrated indication unit. It is thereby possible to minimize the space required in the grooves for the indications. The mass unbalance entailed by indicators on the circumference of the tire can be minimized. The possible effect of indicators on other parameters of the tire can be minimized.

It is particularly advantageous if a tread profile is formed in accordance with the features of another embodiment, wherein the groove is formed with a groove depth $T_P$ forming the profile depth of the tire, where 10 mm $\leq T_P \leq$ 30 mm. In such designs, regrooving is particularly expedient since here the service life measured on the basis of the initial profiling can be increased in a particularly efficient way.

It is particularly advantageous if a tread profile is formed in accordance with the features of a further embodiment, wherein the groove is a circumferential groove, in which a plurality of regrooving indicators—in particular a maximum of six—are formed in an arrangement distributed over the circumference. As a result of this configuration, manual regrooving via a regrooving knife is promoted, and the optical measuring capacity is improved.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
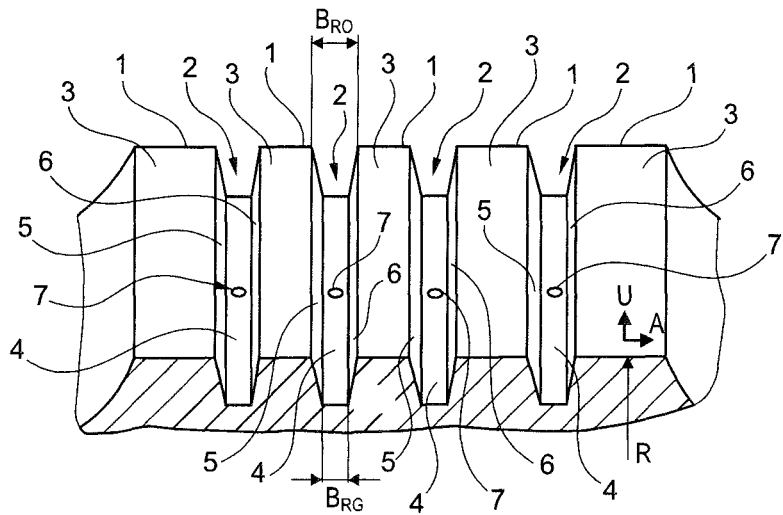
FIG. 1 shows a segment of the circumference of a regroovable tread profile of a pneumatic vehicle tire for commercial vehicles.

FIGS. 1 to 4 show a regroovable tread profile of a pneumatic vehicle tire for commercial vehicle tires, in which radially raised profile strips 1 extending over the entire circumference of the pneumatic vehicle tire and aligned in the circumferential direction U are arranged adjacent to one another in the axial direction A of the pneumatic vehicle tire, wherein two axially adjacent profile strips 1 in each case are spaced apart from one another axially by a circumferential groove 2 aligned in the circumferential direction U of the pneumatic vehicle tire and extending over the entire circumference of the pneumatic vehicle tire. The profile strips 1 are each delimited in the radially outward direction R by a radially outer surface 3, which forms the bottom contact surface, forming the circumferential surface of the tire. The circumferential grooves 2 are delimited in the radially inward direction R by a groove base 4 which extends over the entire circumference of the pneumatic vehicle tire and is aligned in the circumferential direction U. The circumferential grooves 2 are each delimited in the axial direction A of the pneumatic vehicle tire on one side by a flank 5 of one profile strip 1 delimited by the circumferential groove 2 and on the other side by a flank 6 of the other profile strip 1 delimited by the circumferential groove 2. The flanks 5 and 6 each extend from the inside outward in the radial direction R, starting from the groove base 4, as far as the radially outer surface 3 of the respective profile strip 1 delimited by the flank 5 or 6, and in the process form the two groove walls of the circumferential groove 2.

At the groove base 4, the circumferential grooves 2 are each formed with a width $B_{RG}$ of the groove base 4, measured transversely to the principal direction of extent of the respective circumferential groove 2 and thus in the axial direction A of the pneumatic vehicle tire, and, in the radially outer circumferential surface, are formed with a groove width $B_{RO}$. The width at the radially outer surface $B_{RO}$ is in each case the measure of the spacing between the intersection of the flank 5 with the radially outer surface 3 of the profile strip 1 delimiting the circumferential groove 2 on one side, measured in the axial direction A in the cross-sectional planes containing the tire axis, and the intersection of the flank 6 with the radially outer surface 3 of the profile strip 1 delimiting the circumferential groove 2 on the other side. The groove widths $B_{RG}$ and $B_{RO}$ are governed by $B_{RO} > B_{RG}$.

The groove base 4 is formed with a rectilinear contour profile in the cross-sectional planes perpendicular to the direction of longitudinal extent of the circumferential grooves 2 and thus in the cross-sectional planes containing the tire axis in the illustrative embodiment shown.

The circumferential groove 2 is in each case formed with a depth $P_T$ which corresponds to the profile depth of the tire and which is measured inward in the radial direction R as far as the groove base 4, starting from the radially outer surface 3. The profile depth $P_T$ is formed so that 10 mm ≤ $P_T$ ≤ 30 mm, for example, so that $P_T$ = 15 mm.

A plurality of regrooving indicators 7 is formed in the groove base 4 of the circumferential grooves 2, in each case in a manner distributed over the circumference of the circumferential groove 2. For example, two, three, four, five or six regrooving indicators are formed in a circumferential groove in a manner distributed over the circumference of the circumferential groove 2. In a special embodiment, just a single regrooving indicator 7 is formed in a circumferential groove 2.

Figure 2:
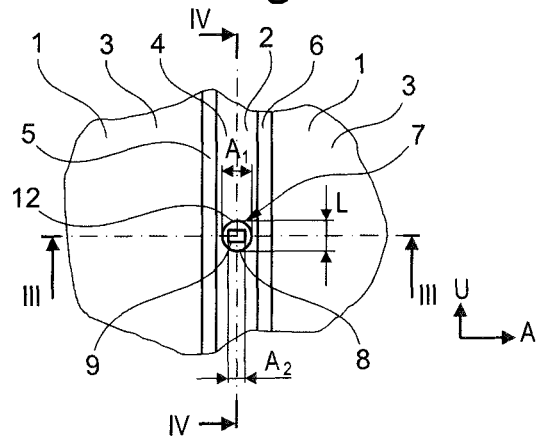
FIG. 2 is an enlarged view of a circumferential groove of the tread profile of FIG. 1 with a regrooving indicator in plan view of the tread profile.
Figure 3:
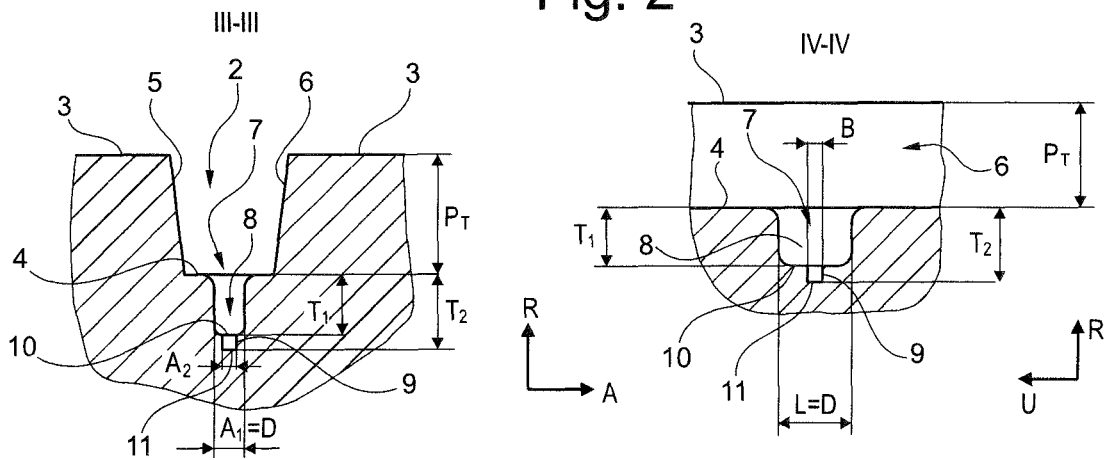
FIG. 3 is a sectioned view of the circumferential groove with a regrooving indicator in accordance with section of FIG. 2.
Figure 4:
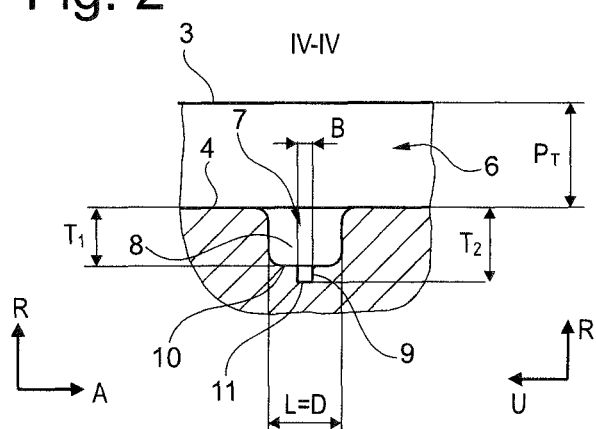
FIG. 4 is a sectioned view of the circumferential groove with a regrooving indicator in accordance with section IV-IV of FIG. 2.

Here—as indicated in FIGS. 2 to 4—the regrooving indicator 7 is in each case formed with a depression 8 in the form of a blind hole and with an additional indent 9. The depression 8 in the form of a blind hole is cylindrical with a cylindrical circumferential surface and with a cylinder axis which is aligned substantially in the radial direction R of the pneumatic vehicle tire, and is delimited in the radially inward direction by a depression base 10, which forms one end face of the cylindrical shape. The other end face of the cylindrical shape is formed by the intersection contour of the cylindrical circumferential surface with the groove base 4. The cylinder is formed with a cylinder diameter D. The depression 8 thus extends along the principal direction of extent of the circumferential groove 2 and thus—in the illustrative embodiment shown—in the circumferential direction U over a length L of extent and transversely to the principal direction of extent of the circumferential groove and thus—in the illustrative embodiment shown—in the axial direction A of the pneumatic vehicle tire over a width $A_1$ of extent, wherein the following applies for the length L of extent and the width $A_1$ of extent in the case of the illustrative cylinder with a cylindrical circumferential surface in the form of a circular cylinder: $L = A_1 = D$.

Starting from the groove base 4, the depression 8 is formed in the radially inward direction R with a depth $T_1$, which forms the radial spacing from the groove base 4 to the depression base 10. The regrooving indicator 7 is additionally formed via an indent 9, which extends in the groove base 10 transversely to the principal direction of extent of the circumferential groove 2—and thus, in the illustrative embodiment shown, in the axial direction A of the pneumatic vehicle tire—with a length $A_2$ of extent and with an indent width B, measured transversely thereto in the principal direction of extent of the circumferential groove 2—and thus in the circumferential direction U—where B is formed so that $B < A_2$, $B < A_1$ and $B < L$. The indent 9 is formed with a constant width B in the radially inward direction R as far as a depth $T_2$, at which the indent 9 is delimited in the radially inward direction by an indent base 11. The indent depth $T_2$ is the spacing, measured in the radial direction R, between the groove base 4 and the indent base 11. The depths $T_1$ and $T_2$ are formed so that $T_2 > T_1$.

The indent depth $T_1$ is formed so that 0.5 mm ≤ $T_1$ ≤ 5 mm. The indent depth $T_2$ is formed so that 1.5 mm ≤ $T_2$ ≤ 6 mm. Here, the depths $T_1$ and $T_2$ are chosen so that $T_2 = (T_1 + 1$ mm$)$. For example, $T_2$ = 5 mm and $T_1$ = 4 mm.

The length L of extent of the depression 8 in the form of a blind hole is formed so that 2 mm ≤ L ≤ 5 mm. The width $A_1$ of extent is formed so that 2 mm ≤ $A_1$ ≤ 5 mm. In the illustrative embodiment shown, in which the depression 8 is configured as a circular-cylindrical depression in the form of a blind hole with the diameter D, the diameter D is formed so that 2 mm ≤ D ≤ 5 mm. For example, $L = A_1 = D = 4$ mm is chosen.

The width B of the indent 9 is formed so that 0.5 mm ≤ B ≤ 1 mm. The length $A_2$ of extent of the indent 9 is formed so that $B_{RO} > A_2 > B_{RG}$.

Figure 5:
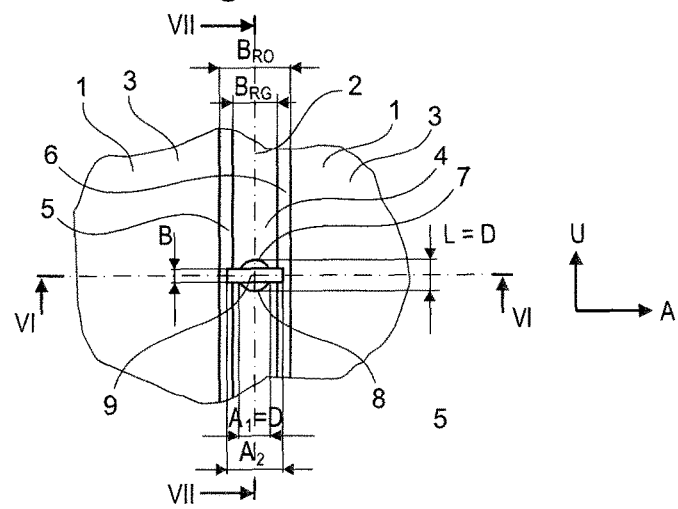
FIG. 5 shows the circumferential groove with a regrooving indicator in an alternative embodiment in plan view.
Figure 6:
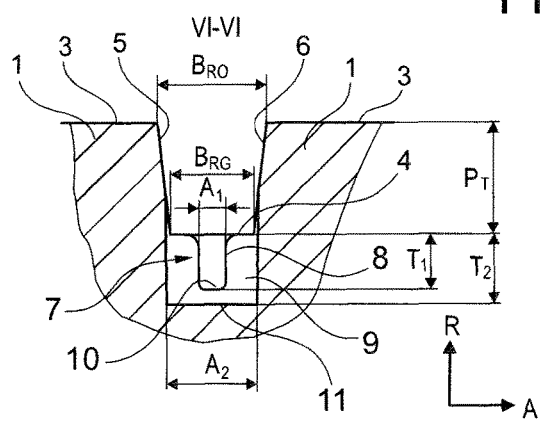
FIG. 6 is a sectioned view of the circumferential groove in accordance with section VI-VI of FIG. 5.
Figure 7:
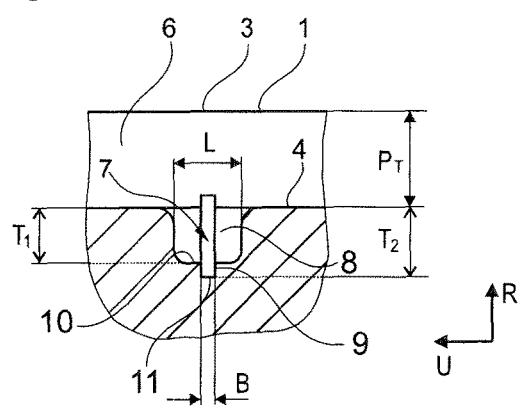
FIG. 7 is a sectioned view of the circumferential groove in accordance with section VII-VII of FIG. 5; and, FIG. 8 shows a circumferential groove and a regrooving indicator in an alternative embodiment, in which the regrooving indicator is positioned in the position of an abrasion indicator, the view being similar to that of FIG. 7.

In the illustrative embodiments shown in FIGS. 2 to 4, the indent 9 is formed with a length $A_2$ of extent which is less than the width $A_1$ of extent of the depression. In another illustrative embodiment (not shown), the length $A_2$ of extent is equal to the width $A_1$ of extent and, on both sides, ends at the cylinder contour of the depression 8. In both of these embodiments, the depression base 10 forms the indication of the regrooving indicator 7 for the minimum regrooving depth that has not yet been reached. The indent base 11 forms the indication for the maximum regrooving depth that has not yet been reached. FIGS. 5 to 7 show an alternative illustrative embodiment, in which the regrooving indicator 7 is formed with the depression 8 and the indent 9 in the manner described with reference to FIGS. 1 to 4, but the length $A_2$ of extent of the indent 9 is formed so that $A_2 > A_1$ and the indent 9 extends beyond the circular-cylindrical contour of the depression 8 on both sides along its direction of extent. In the illustrative embodiment shown, the length $A_2$ of extent is formed so that $B_{RO} > A_2 > B_{RG}$, wherein the indent 9 forms an extension beyond the circular-cylindrical contour of the depression 8 as far as the axial region of extent of the flanks 5 and 6 and ends there. In this illustrative embodiment, the length $A_2$ of extent provides additional information on the regrooving width of the circumferential groove to be recut. The tool used for regrooving is chosen so that it allows for the indicated width $A_2$ of the circumferential groove to be recut and recuts a groove of width $A_2$.

In an illustrative embodiment which is not shown, the depression 8 illustrated in FIGS. 1 to 4 and in FIGS. 5 to 7 is configured as a cylindrical depression in the form of a blind hole which has an elliptical or oval cross section of the cylinder circumferential surface thereof. In this case, the longer of the two principal axes of extent of the oval or elliptical contour is aligned in the principal direction of extent of the circumferential groove 2 and thus specifies the length L of extent of the depression 8. The shorter of the two principal axes of extent of the oval or elliptical contour is aligned in the transverse direction of the circumferential groove 2 and thus in the axial direction A of the pneumatic vehicle tire. The length of extent thereof thus forms the length $A_1$ of extent of the depression 8, wherein in this case L and $A_1$ are configured so that $L > A_1$.

In an embodiment which is not shown, the depression 8 in the form of a blind hole is configured as a frustoconical depression, wherein the cone axis, like the cylinder axis in the embodiments illustrated, is configured to extend substantially in the radial direction R and the circumferential surface of the frustocone tapers in a constant manner, from the groove base 4 to the depression base 10. For example, the circumferential surface of the frustocone is circular in the cross sections perpendicular to the cone axis thereof. At the groove base 4, the circumferential surface of the frustocone has a larger diameter than at the depression base 10.

Figure 8:
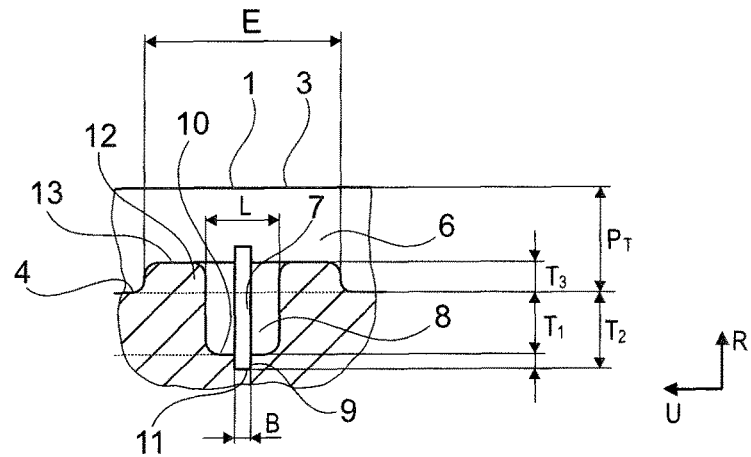

FIG. 8 shows an alternative arrangement of the regrooving indicator 7. In this illustrative embodiment, a plurality of abrasion indicators (TWI) 12 of known type is formed in a manner distributed over the circumference of the pneumatic vehicle tire, rising radially outward as raised portions extending in the radial direction R of the pneumatic vehicle tire from the groove base 4 over a height $T_3$ of extent, between the profile strips 1 delimiting the circumferential groove 2, and extending over the entire width of the circumferential groove 2. In a known manner, the abrasion indicator 12 (TWI) is formed so as to be delimited at the distance $T_3$ from the groove base 4 in a radially outward direction by a virtually flat radially outer surface 13, which indicates the maximum permissible abrasion of the tire. As illustrated in FIG. 8, the regrooving indicator 7 is formed with its depression 8 and the indent 9 centrally within the length of circumferential extent of the outer surface 13 of the raised portion forming the abrasion indicator 12 when viewed in the circumferential direction U of the tire. The further configuration of the regrooving indicator 7 is designed as shown or described in the embodiments illustrated or described with reference to FIGS. 1 to 4 and FIGS. 5 to 7. By virtue of the integrated design of the regrooving indicator 7 and of the abrasion indicator 12, the minimum regrooving depth is additionally indicated by the depression base 10 and the maximum regrooving depth by the indent base 11 at this position. In one embodiment, the regrooving indicator 7 is formed as illustrated in FIGS. 1 to 4. In another embodiment, which is illustrated in FIG. 8, the regrooving indicator 7 is formed as illustrated in FIGS. 5 to 7. In this case, the common regrooving indicator 7, which is embodied so as to integrate the abrasion indicator 12 as well, additionally indicates the regrooving width of the circumferential groove to be recut via the special configuration of the indent length $A_2$.

In the circumferential direction U of the pneumatic vehicle tire, the abrasion indicator 12 is formed with a length E of extent, where $5L \leq E \leq 2L$.

In the illustrative embodiment shown in FIG. 1, the profile strips 1 are each configured as circumferential ribs extending over the circumference of the pneumatic vehicle tire. In another embodiment (not shown), the profile strips 1 are configured as profile block rows of known type which extend over the entire circumference of the pneumatic vehicle tire and are formed by profile block elements arranged in series in the circumferential direction U of the pneumatic vehicle tire and in each case spaced apart from one another by transverse grooves. In another embodiment (not shown), some of the profile strips are configured as circumferential ribs and some of the profile strips are configured as profile block rows.

As shown in FIGS. 3 and 4, in FIGS. 6 and 7 and in FIG. 8, in a partially exaggerated way, the transitions between the depression base 10 and the cylindrical circumferential surface of the depression 8 in the form of a blind hole and between the cylindrical circumferential surface of the depression 8 in the form of a blind hole and the groove base 4 are of rounded design.

To determine the extent of the depression 8 at the groove base 4 and at the depression base 10, the extended intersection of the circumferential surface of the depression 8 with the groove base 4 and with the depression base 10 is used. In the case of a circular-cylindrical circumferential surface, the diameter D is constant along the entire extent of the cylinder along the cylinder axis thereof and is used as a measure $A_1$ or L.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)
1 profile strip
2 circumferential groove
3 radially outer surface forming the circumferential surface
4 groove base
5 flank
6 flank
7 regrooving indicator
8 depression in the form of a blind hole
9 indent
10 depression base
11 indent base
12 abrasion indicator (TWI)
13 surface

What is claimed is:

1. A tread profile of a pneumatic vehicle tire defining a radial direction (R), the tread profile comprising:
a regroovable tread profile having radially raised profile elements and defining at least one groove which separates two mutually adjacent ones of said raised profile elements;
said at least one groove defining a main extension direction (U) and having a groove base delimiting said at least one groove inwardly in the radial direction (R);
said at least one groove having at least one regrooving indicator formed in said corresponding groove base;
said at least one regrooving indicator including a blind-hole shaped depression having an intercept contour and a depression base;
said blind-hole shaped depression with said intercept contour having an extension length (L) measured in said main extension direction (U) and an extension width ($A_1$) measured transverse to said main extension direction (U);
said blind-hole shaped depression being, in the radial direction (R), inwardly delimited by said depression base;
said blind-hole shaped depression having an extension depth ($T_1$) measured inwardly in the radial direction (R) starting from said groove base to said depression base;
said extension depth ($T_1$) being configured to indicate a regrooving depth;
said at least one regrooving indicator further including an indent in said depression base of said blind-hole shaped depression and said indent being orientated transverse to said main extension direction (U);
said indent having an indent base radially inwardly delimiting said indent;
said indent further having an indent extension length ($A_2$) measured transverse to said main extension direction (U), an indent width (B) measured in said main extension direction (U), and an indent depth ($T_2$) measured in the radial direction (R) starting from said groove base and continuing to said indent base;
said indent width (B) being less than said indent extension length ($A_2$) and said indent width (B) being less than said extension length (L);

said indent depth ($T_2$) being greater than said extension depth ($T_2$);
said extension depth ($T_2$) being configured to form a measure for a minimum regrooving depth;
said indent depth ($T_2$) being configured to form a measure for a maximum regrooving depth; and,
wherein said indent extension length ($A_2$) is less than said extension width ($A_1$).

2. The tread profile of claim 1, wherein:
said extension length (L) of said blind-hole shaped depression lies in a range of 2 mm≤L≤5 mm; and,
said extension width ($A_1$) lies in a range of 2 mm≤$A_1$≤5 mm.

3. The tread profile of claim 1, wherein:
said extension depth ($T_1$) lies in a range of 0.5 mm≤$T_1$≤5 mm; and,
said indent depth ($T_2$) lies in a range of 1.5 mm≤$T_2$≤6 mm.

4. The tread profile of claim 1, wherein said extension depth ($T_1$) and said indent depth ($T_2$) have a relationship $T_2=(T_2+1$ mm).

5. The tread profile of claim 1, wherein said indent width (B) lies in a range of 0.5 mm≤B≤1 mm.

6. The tread profile of claim 1, wherein:
said at least one groove has a first groove width ($B_{RG}$) measured at said groove base transverse to said main extension direction (U);
said indent extension length ($A_2$) is less than said first groove width ($B_{RG}$);
the tread profile defines an outer circumferential surface;
said at least one groove further has a second groove width ($B_{RO}$) measured at said outer circumferential surface transverse to said main extension direction (U); and,
said indent extension length ($A_2$) is less than said second groove width ($B_{RO}$).

7. The tread profile of claim 1, wherein said blind-hole shaped depression is formed in said groove base of said at least one groove having one of a circular, elliptical, and oval section contour.

8. The tread profile of claim 1, wherein:
said blind-hole shaped depression is cylinder shaped and defines a cylinder axis substantially extending in the radial direction;
said depression base forms a first end surface of the cylinder; and,
said cylinder has a second end surface formed by the intercept contour with said groove base.

9. The tread profile of claim 1, wherein:
said blind-hole shaped depression has a truncated cone shape and defines a cone axis substantially extending in the radial direction (R);
said depression base forms a first end face of said cone;
said cone has a second end face surrounded by the intercept contour with said groove base; and,
said first end face is smaller than said second end face.

10. The tread profile of claim 1, wherein:
said groove base has a raised portion forming a wear indicator (TWI); and,
said at least one regrooving indicator is formed in said raised portion.

11. The tread profile of claim 1, wherein said at least one groove has a groove depth $T_P$ lying in a range of 10 mm≤$T_P$≤30 mm.

12. The tread profile of claim 1, wherein said at least one groove in a circumferential groove defining a circumference and having a plurality of said at least one regrooving indicators distributed over said circumference.

13. The tread profile of claim 1, wherein the pneumatic vehicle tire is configured for a commercial vehicle.

14. A tread profile of a pneumatic vehicle tire defining a radial direction (R), the tread profile comprising:
a regroovable tread profile having radially raised profile elements and defining grooves which separate each two mutually adjacent ones of said raised profile elements;
said grooves defining a main extension direction (U) and having respective groove bases delimiting said grooves inwardly in the radial direction (R);
each of said groove bases having at least one regrooving indicator formed therein;
said at least one regrooving indicator including a blind-hole shaped depression having an intercept contour and a depression base;
said blind-hole shaped depression with said intercept contour having an extension length (L) measured in said main extension direction (U) and an extension width ($A_1$) measured transverse to said main extension direction (U);
said blind-hole shaped depression being, in the radial direction (R), inwardly delimited by said depression base;
said blind-hole shaped depression having an extension depth ($T_1$) measured inwardly in the radial direction (R) starting from said groove base to said depression base;
said extension depth ($T_1$) being configured to indicate a regrooving depth;
said at least one regrooving indicator further including an indent in said depression base of said blind-hole shaped depression and said indent being orientated transverse to said main extension direction (U);
said indent having an indent base radially inwardly delimiting said indent;
said indent further having an indent extension length ($A_2$) measured transverse to said main extension direction (U), an indent width (B) measured in said main extension direction (U), and an indent depth ($T_2$) measured in the radial direction (R) starting from said groove base and continuing to said indent base;
said indent width (B) being less than said indent extension length ($A_2$) and said indent width (B) being less than said extension length (L);
said indent depth ($T_2$) being greater than said extension depth ($T_1$);
said extension depth ($T_1$) being configured to form a measure for a minimum regrooving depth;
said indent depth ($T_2$) being configured to form a measure for a maximum regrooving depth; and,
wherein said indent extension width ($A_2$) is less than said extension width ($A_1$).

* * * * *

UNITED STATES PATENT AND TRADEMARK OFFICE
CERTIFICATE OF CORRECTION

PATENT NO. : 9,862,237 B2  
APPLICATION NO. : 14/306034  
DATED : January 9, 2018  
INVENTOR(S) : J. Hoffmann et al.

Page 1 of 1

It is certified that error appears in the above-identified patent and that said Letters Patent is hereby corrected as shown below:

On the Title Page

Under "(72) Inventors": delete "Jens Hoffmann, Meersbusch (DE)" and substitute -- Jens Hoffmann, Meerbusch (DE) -- therefor.

In the Specification

In Column 6:
Line 8: add -- III-III -- after "section".

In Column 9:
Line 39: delete "$5L \leq E \leq 2L$" and substitute -- $5L \geq E \geq 2L$ -- therefor.

In the Claims

In Column 11:
Line 2: delete "$T_2$" and substitute -- $T_1$ -- therefor.
Line 3: delete "$T_2$" and substitute -- $T_1$ -- therefor.
Line 21: delete "$T_2$" and substitute -- $T_1$ -- therefor.

Signed and Sealed this  
Seventeenth Day of April, 2018

Andrei Iancu  
*Director of the United States Patent and Trademark Office*